(12) United States Patent
Schell et al.

(10) Patent No.: US 8,971,726 B2
(45) Date of Patent: Mar. 3, 2015

(54) NETWORK ELEMENT

(75) Inventors: Martin Schell, Berlin (DE); Philipp Vorreau, Zurich (CH)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 280 days.

(21) Appl. No.: 13/520,979

(22) PCT Filed: Jan. 10, 2011

(86) PCT No.: PCT/EP2011/050217
§ 371 (c)(1),
(2), (4) Date: Oct. 11, 2012

(87) PCT Pub. No.: WO2011/083165
PCT Pub. Date: Jul. 14, 2011

(65) Prior Publication Data
US 2013/0022361 A1    Jan. 24, 2013

(30) Foreign Application Priority Data

Jan. 11, 2010 (DE) .......................... 10 2010 004 285

(51) Int. Cl.
| H04B 10/00 | (2013.01) |
| H04J 14/00 | (2006.01) |
| H04B 10/60 | (2013.01) |
| H04B 10/29 | (2013.01) |
| H04J 14/02 | (2006.01) |

(52) U.S. Cl.
CPC .............. *H04B 10/60* (2013.01); *H04B 10/29* (2013.01); *H04J 14/0204* (2013.01); *H04J 14/0205* (2013.01); *H04J 14/0206* (2013.01); *H04J 14/021* (2013.01); *H04J 14/0219* (2013.01)
USPC .............. 398/208; 398/83; 398/135; 398/152

(58) Field of Classification Search
USPC .................................... 398/135, 208, 202, 83
See application file for complete search history.

(56) References Cited

U.S. PATENT DOCUMENTS

| 5,434,693 A | 7/1995 | Tanaka et al. |
| 6,078,418 A * | 6/2000 | Hansen et al. ................. 398/147 |

(Continued)

FOREIGN PATENT DOCUMENTS

| DE | 37 06 463 A1 | 9/1988 |
| DE | 10 2004 043 713 A1 | 3/2006 |

(Continued)

OTHER PUBLICATIONS

M. Filer et al., "Estimation of Phase Ripple Penalties for 40 Gb/s NRZ-DPSK Transmission," dated 2009, pp. 1-3, Optical Society of America, Washington, DC.

(Continued)

*Primary Examiner* — Oommen Jacob
(74) *Attorney, Agent, or Firm* — Brinks Gilson & Lione

(57) ABSTRACT

A network element has at least one input, to which an optical signal can be fed, and at least one output, which is equipped to emit an optical signal; a first coupler having an input linked to the network element input and a first and a second output; an optical receiver having at least one input coupled to the second output of the first coupler and at least one output; an optical sender having at least one input of which is linked to the output of the optical receiver; a signal processing device being arranged in the signal path; a second coupler having a first input linked to the first output of the first coupler, a second input linked to the output of the optical sender, and an output which is linked to the first output of the network element.

18 Claims, 2 Drawing Sheets

(56) References Cited

U.S. PATENT DOCUMENTS

| | | |
|---|---|---|
| 2005/0008369 A1* | 1/2005 | Winzer .................... 398/83 |
| 2006/0210211 A1 | 9/2006 | Taylor |
| 2007/0217791 A1* | 9/2007 | Price ...................... 398/152 |
| 2009/0129788 A1 | 5/2009 | Seimetz |
| 2009/0175620 A1 | 7/2009 | Bhatnagar et al. |
| 2013/0022361 A1* | 1/2013 | Schell et al. .............. 398/135 |

FOREIGN PATENT DOCUMENTS

| | | |
|---|---|---|
| DE | 10 2006 030 915 B4 | 4/2008 |
| EP | 1 496 636 A1 | 1/2005 |
| EP | 1496636 A1 * | 1/2005 |
| WO | WO 03/049393 A1 | 6/2003 |

OTHER PUBLICATIONS

Satoshi Tsukamoto et al., "Coherent Demodulation of 40-Gbit/s Polarization-Multiplexed QPSK Signals with 16-GHz Spacing after 200-km Transmission," dated 2005, pp. 1-3, Optical Society of America, Washington, DC.

Sorin Tibuleac, "ROADM Network Design Issues," dated Mar. 23, 2009, pp. 1-48, ADVA Optical Networking, Atlanta, Georgia.

* cited by examiner

NETWORK ELEMENT

BACKGROUND

The invention relates to a network element with at least one first input, to which an optical signal may be supplied, and at least one first output, which is designed to emit an optical signal.

US 2009/0175620 A1 discloses a network element of the type stated in the introduction. This known network element has a first input, to which an optical signal may be supplied. The optical signal comprises a plurality of different channels with in each case one dedicated frequency or wavelength. Furthermore, the known network element comprises an optical switch, which applies individual channels of the optical input signal to predeterminable outputs by means of optical filters. In addition, a further input may be provided, being adapted to add an additional signal to the output signal. The network element may therefore be used for converting predeterminable channels of the optical input signal, unchanged, into the output signal and extracting individual channels of the optical signal and providing said individual channels at a further electrical or optical output. Finally, the network element may receive an input signal via a further input which is likewise supplied to the output signal.

However, this known device has the disadvantage that, owing to the use of the optical switch, high insertion losses occur. In some embodiments, the filters used in the optical switch may cause phase ripple, which has a disadvantageous influence on the signal quality and restricts the possibility of cascading a plurality of said network elements. If the capacity of an optical network equipped with the known network element is intended to be increased by virtue of a greater number of optical channels with in each case a dedicated, associated wavelength, at least some of the optical switches need to be replaced. Therefore, the increase in the capacity of the optical network involves considerable complexity which means longer downtimes of the optical network. Furthermore, the known network elements cannot be scaled during operation, i.e. it is not possible to increase or lower the number of channels after installation.

It is therefore an object of the present invention to provide a network element having fewer insertion losses, having less influence on the signal quality and allowing easy scalability of the optical network equipped with the network element.

SUMMARY

The disclosed network element has a first input, to which an optical input signal may be supplied. The optical signal comprises a plurality of different channels with in each case one associated frequency or wavelength. The input signal is converted into an output signal, the user data of at least one channel being at least partially manipulated.

In some embodiments of the invention, the proposed network element may comprise a reconfigurable, optical add-drop multiplexer, which removes a data stream from the input signal and/or adds a data stream and/or changes a data stream. In other embodiments of the invention, the network element may regenerate an optical signal in order to compensate for the decreasing signal quality owing to the dispersion of the fibers carrying the signal. In this case, the regeneration may include amplification and/or pulse shaping and/or timing correction.

Instead of the optical switch, the invention proposes the use of an optical coupler, which couples out a predeterminable component of the input signal. This component is converted into an electrical signal by means of an optical receiver. The electrical signal may then be processed by means of a signal-processing device. The output signal of the signal-processing device may be converted into an optical signal by means of an optical transmitter. Then, the modified optical signal may be supplied back to the output signal by means of a second coupler.

In contrast to the known network element, the selectivity in respect of a predeterminable optical wavelength and therefore the selectivity in respect of a predeterminable channel of an optical signal comprising a plurality of channels is not achieved by an optical filter, but by the predeterminable mid-frequency and the finite bandwidth of an optical receiver, which converts the optical signal into an electrical signal. In this way, the mid-frequency and therefore the channel to be selected may be selected in a simple manner using the optical receiver.

The coupling of the individual assemblies of the network element may be performed directly, i.e. without any further, interposed component, or indirectly, i.e. via at least one interposed component or via an assembly comprising a plurality of components.

In some embodiments of the invention, the optical receiver may be designed to only convert light of an individual, predeterminable channel or wavelength range into an electrical signal. In this way, the network element according to the invention allows coupling-out or regeneration of an individual, predeterminable partial data stream from an input signal, which transports a plurality of independent data streams in independent channels.

In some embodiments of the invention, provision may be made for the signal-processing device to provide a selected partial data stream as electrical data stream by means of a further output. The partial data stream may comprise the data stream of one channel or at least part of the data stream of one channel. Furthermore, the signal-processing device may have a further input, by means of which a data stream may be modulated onto the optical input signal. In this way, the data stream of one channel of the input signal may be branched off, for example in order to conduct said data stream to another destination on another optical fiber. The now redundant transmission capacity may then be used by a further data stream, which is conducted from another feed-in point to the network element according to the invention.

A particularly reliable selection of a channel or wavelength range from the optical input signal may be achieved by means of a local oscillator, which provides an optical signal of a predeterminable wavelength, which approximately corresponds to the wavelength of the subcarrier of the respective channel. For this purpose, the local oscillator may comprise, for example, a light-emitting diode, a semiconductor laser or another optoelectronic semiconductor component. If the local oscillator is adjustable, the signal coupled out by the optical receiver may be varied in a particularly simple manner by changing the wavelength emitted by the local oscillator.

BRIEF DESCRIPTION OF THE DRAWINGS

The invention will be explained in more detail below with reference to exemplary embodiments and figures, without the general concept of the invention being restricted in any way. In the figures.

DESCRIPTION OF PREFERRED EMBODIMENTS

Figure 1:
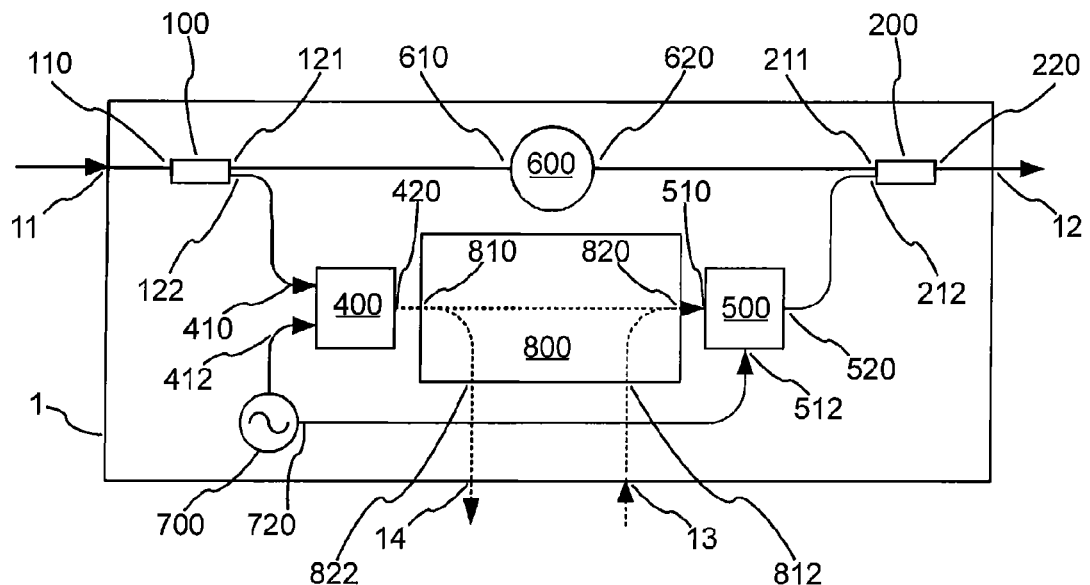
FIG. 1 shows the block diagram of a network element proposed according to the invention.

FIG. 1 shows an embodiment of the network element 1 proposed according to the invention. The network element 1 has a first input 11, to which an optical input signal may be supplied. The input signal received via the first input 11 may be supplied in the free optical path. Usually, however, the input signal is supplied by means of an optical waveguide known per se or an optical fiber. The optical input signal may comprise a plurality of useful data streams, which are transported in independent channels independently of one another. In this case, each channel may have a unique wavelength or carrier frequency which differs from the carrier frequency of an adjacent channel. In some embodiments of the invention, the difference between two adjacent carrier frequencies may be approximately 100 GHz. In other embodiments of the invention, the difference may be approximately 50 GHz or approximately 25 GHz or 1 GHz or less than 1 GHz.

Downstream of the input 11 of the network element 1, the input signal arrives at a first coupler 100. The first coupler 100 has at least one input 110 and at least two outputs 121 and 122. The coupler 100 may be in the form of a fused coupler, in which a coupling-out optical waveguide is arranged so as to bear against the input optical waveguide, with the result that a predeterminable component of the signal is transmitted into the coupling-out optical waveguide by means of crosstalk. In other embodiments of the invention, the coupler 100 may be an interference coupler. In some embodiments of the invention, the coupler 100 may have more than the two output waveguides 121 and 122 illustrated in FIG. 1. In some embodiments, a plurality of couplers 100 may be cascaded in order to provide a plurality of output waveguides. For example, the number of output waveguides may be between two and ten. Correspondingly, the devices 400, 800 and 500 are then also provided multiply. For the understanding of the invention, however, only a single coupler 100 with two output waveguides 121 and 122 is described in the description below.

In the second output waveguide 122 of the coupler 100, a predeterminable component of the optical signal is coupled out of the input signal at the input 11. The component may be approximately 5% to approximately 25%. In some embodiments of the invention, the component is between 10 and 15%. The remaining signal leaves the coupler 100 via the output 121.

The signal on the optical fiber 122 is supplied to the first input 410 of an optical receiver 400. The optical receiver 400 converts the optical input signal at the input 410 into an electrical signal, which is provided at the output 420. The input signal supplied to the optical receiver 400 still comprises all of the channels comprised in the input signal. In order to select a predeterminable channel from the input signal, a local oscillator 700 is used in the embodiment illustrated in FIG. 1. The local oscillator 700 has outputs 720, at which an optical signal of the local oscillator is provided. The local oscillator 700 may comprise an optoelectronic semiconductor component, for example a semiconductor laser. In this case, the local oscillator 700 provides an optical signal with a small bandwidth, said signal having approximately the same wavelength as the optical carrier of the channel to be extracted from the input signal. The optical signal of the local oscillator is supplied to the optical receiver 400 via a second input 412.

In the optical receiver 400, the superimposition of all of the wavelengths provided in the input signal with the output signal of the local oscillator 700 results in different mixed products. In this case, the bandwidth of the optical receiver 400 is set in such a way that all of the mixed products apart from one are outside the bandwidth of the optical receiver. In this way, the desired useful data stream of the selected channel is provided at the output 420 of the optical receiver 400.

The useful data stream is supplied as electrical signal to the input 810 of the signal-processing device 800. The signal-processing device 800 may comprise an analog and/or a digital circuit. The signal-processing device 800 may be provided for manipulating the data stream in a predeterminable manner. In some embodiments, the signal-processing device 800 may perform regeneration of the signal. The regeneration may include improvement of the timing, amplification and/or pulse shaping. In other embodiments of the invention, the signal-processing device 800 may perform inversion of the signal. In some embodiments, the signal-processing device 800 may perform format conversion of the input signal. In some embodiments of the invention, the signal-processing device 800 may provide the useful data stream via a second output 822. The useful data stream may then leave the network element 1 via the second output 14 as an optical or electrical signal.

In some embodiments of the invention, the signal-processing device 800 may receive a new useful data stream via the second input 812. This new useful data, stream may be supplied to the network element 1 via the input 13 as an optical or electrical signal.

The useful signal processed by the signal-processing device 800 leaves the signal-processing device 800 via the output 820.

The output signal of the signal-processing device 800 is supplied to an optical transmitter 500 via the input 510 thereof. The optical transmitter may comprise an optoelectronic semiconductor component, which, in a manner known per se, generates an optical, modulated carrier signal. In this way, a signal is provided at the output 520 of the optical transmitter 500 which comprises at least the information of the data stream which was provided at the output 820 of the signal-processing device 800.

In some embodiments of the invention, the optical transmitter 500 may comprise a modulator, which modulates an optical carrier signal, which is provided by the local oscillator 700 and is supplied to the optical transmitter via the input 512 thereof. In this way, the carrier frequency of the signal provided at the output 520 may be monitored with considerable accuracy.

The optical data signal provided at the output 520 of the optical transmitter 500 is supplied to a second optical coupler 200 via an input 212. The optical coupler 200 may be a fused coupler or an interference coupler, in the same way as the first coupler 100. Furthermore, the input signal which has left the first coupler 100 via the output 121 is still supplied to the coupler 200 via a first input 211.

In the second coupler 200, the input signal interferes with the signal provided at the output 520. In order to be able to adjust the phase difference between the two signals provided for the interference to a predeterminable value, in some embodiments of the invention a delay element 600 with an input 610 and an output 620 may be provided. In some embodiments of the invention, the delay element 600 may be an optical waveguide with a predeterminable length, with the delay corresponding to the propagation time of the signal on this optical waveguide.

The signal provided at the output 820 of the signal-processing device 800 may, in some embodiments of the invention, be formed in such a way that it comprises a signal component which cancels the signal originally transported on this channel in the event of interference in the second coupler 200. In this way, the channel in question at the output 220 of the second coupler 200 represents the data signal supplied via the input 13 and/or the data signal regenerated or changed in the signal-processing device 800. The optical signal emerging from the second coupler 200 leaves the network element 1 via the output 12 thereof. In turn, the output 12 may comprise a free optical path or an optical waveguide.

In some embodiments of the invention, the network element 1, as optoelectronic semiconductor component, may be integrated monolithically on a single substrate. In other embodiments of the invention, the network element 1 may have a partially integrated configuration. In this case, only some of the elements illustrated in FIG. 1 of the network element 1 are integrated monolithically on a substrate. Other elements may then be provided on one or more further substrates. A plurality of semiconductor substrates may be combined in a single housing. In some embodiments of the invention, the individual components of the network element 1 may be arranged in different housings, which are combined on a circuit carrier, for example a printed circuit board.

In some embodiments of the invention, the signal-processing device 800 may comprise a programmable logic circuit or a use-specific semiconductor chip. In some embodiments of the invention, the signal-processing device 800 may comprise a microprocessor or a microcontroller, on which software is run such that the signal-processing device 800 implements the function for which it is intended.

Figure 2:
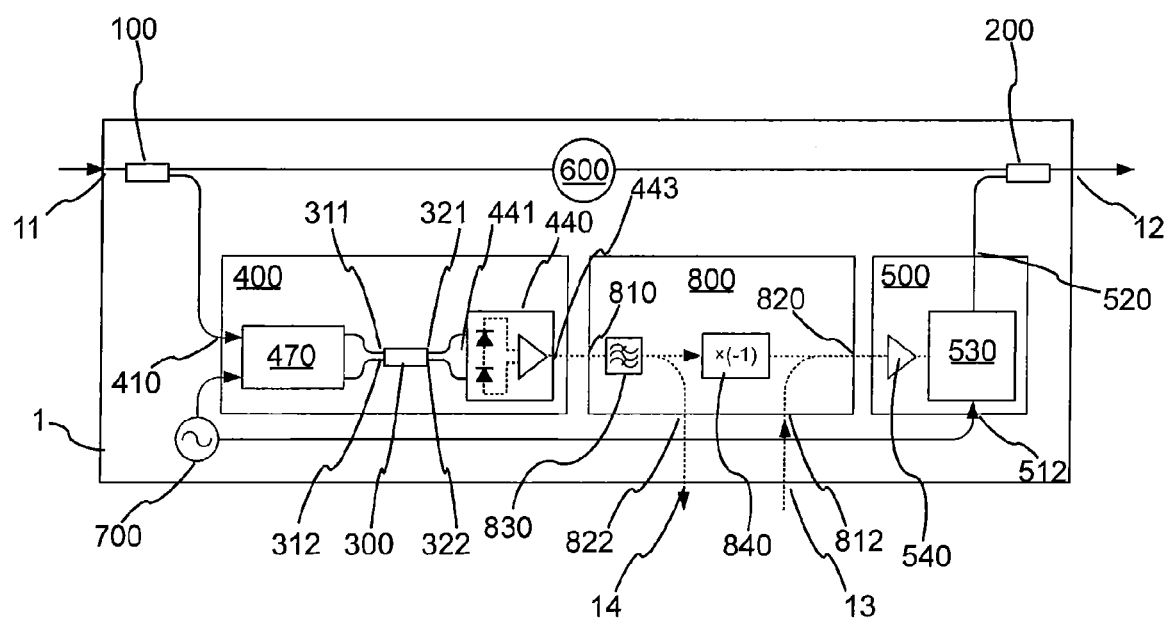
FIG. 2 shows the block diagram of an embodiment of the network element according to the invention with analog signal processing.

FIG. 2 shows an embodiment of a network element 1 according to the invention which will be used to explain the design of the optical receiver 400, the signal-processing device 800 and the design of the optical transmitter 500 in more detail.

The embodiment of the invention shown in FIG. 2 comprises first and second couplers 100 and 200 and a delay element 600, as explained in connection with FIG. 1. Furthermore, the network element shown in FIG. 2 also comprises a local oscillator 700, which provides an optical signal of a predeterminable wavelength.

The optical receiver 400 shown in FIG. 2 comprises a third coupler 300 with a first input 311, a second input 312, a first output 321 and a second output 322. In some embodiments, the third coupler 300 may be a 2×2 multimode interference coupler. In this case, in the third coupler 300 the input signal supplied via the input 410 and the signal of the local oscillator 700 are brought to interference. The interference signal is provided at the two outputs 321 and 322 of the third coupler 300 and is supplied to a difference signal detector 440 via the inputs 441.

In some embodiments of the invention, provision may be made for a device 470 for polarization regulation to be arranged in the signal path between the input 410 of the optical receiver 400 and the first input 311 of the third coupler 300 and in the signal path between the second input 412 of the optical receiver 400 and the second input 312 of the third coupler 300. In this way, the polarization of the signal supplied to the third coupler 300 may be tracked, with the result that the polarization always has the same value or the actual value of the polarization only deviates from a setpoint value by a predeterminable difference. In this way, reliable superimposition of the signals in the third coupler 300 is ensured, with the result that the third coupler 300 may provide an optical signal with a high quality factor at the input 441 of the difference signal detector 440.

In other embodiments of the invention, the device 470 for polarization regulation may also be replaced by a steady-state polarization filter. In such an embodiment of the invention, provision may be made for a twofold configuration of the optical receiver 400, with the result that an associated optical receiver 400 is provided for each polarization direction.

The difference signal detector 440 provides an electrical signal at its output 443 which is a function of the difference in the intensities of the optical signals present at the input 441. The difference signal detector 440 may have a finite bandwidth, which is selected such that all of the mix products of the input signals at the input 410 with the signal of the local oscillator 700 are outside this bandwidth, with the exception of a predeterminable mix product, which is formed from the channel to be selected of the input signal. The electrical signal of the difference signal detector 440 then leaves the optical receiver 400 and is supplied to the signal-processing device 800 via the first input 810 thereof.

In the exemplary embodiment illustrated, the signal-processing device 800 has analog electronic signal processing. The signal present at the input 810 may be filtered by an optional low-pass filter 830. In this case, the low-pass filter 830 ensures that the subsequent signal processing only includes the useful signals of the selected optical transmission channel. If the bandwidth limitation of the difference signal detector 440 is selected correspondingly, the low-pass filter 830 may also be dispensed with in some embodiments of the invention.

In some embodiments of the invention, the data signal extracted from the selected optical transmission channel may leave the signal-processing device 800 via the second output 822. The signal may then be provided at the output 14 of the network element 1.

In some embodiments of the invention, the extracted data signal may be supplied to an inverter 840. In this way, an inverted data signal is provided at the first output 820 of the signal-processing device 800, said inverted data signal modulating the optical signal leaving the optical transmitter 500 via the output 520 in such a way that said optical signal interferes with the original optical input signal in the second coupler 200 in such a way that the selected channel in the output signal is canceled or is only present in unmodulated form. As a result, the carrier signal is available for a further useful data stream.

This further useful data stream may be supplied to the network element 1 via the input 13. In this case, the input 13 is coupled to the input 812 of the signal-processing device 800, with the result that the data signal may leave the signal-processing device 800 likewise via the output 820 thereof. The electrical signal at the output 820 therefore comprises the inverted original signal and the data stream to be modulated instead of the original data signal. The data stream supplied via the connection 13 may comprise the identical useful data which were previously provided via the output 14. The useful data may then be subjected to regeneration between the output 14 and the input 13. In other embodiments of the invention, such regeneration may also be performed within the signal-processing device 800. In yet another embodiment of the invention, the data stream leaving the output 14 may comprise different useful data than the data stream supplied to the input 13.

The electrical signal produced in the signal-processing device 800 is supplied to the optical transmitter 500. In the embodiment illustrated, the optical transmitter 500 comprises a modulator 530. An optical carrier is supplied from the local oscillator 700 to the modulator, said optical carrier being modulated with the data stream of the signal-processing device 800. The modulation may comprise, for example, amplitude modulation, phase modulation or another form of modulation known per se.

Furthermore, the optical transmitter may comprise additional components, for example an amplifier 540, which may implement impedance conversion and/or match the current intensity and/or the voltage of the electrical signal. In some embodiments of the invention, the amplifier 540 may implement filtering of the data stream.

In other embodiments of the invention, the optical transmitter 500 may also have a different design and comprise a directly modulatable semiconductor laser instead of the modulator 530, for example.

The signal emitted by the optical transmitter 500 via the output 520 is then brought to interference with the original signal in the second coupler 200. In the process, the data signal inverted in the inverter 840 cancels the original data signal, with the result that the selected channel now only comprises the useful data supplied via the input 13 at the output of the second coupler 200.

Figure 3:
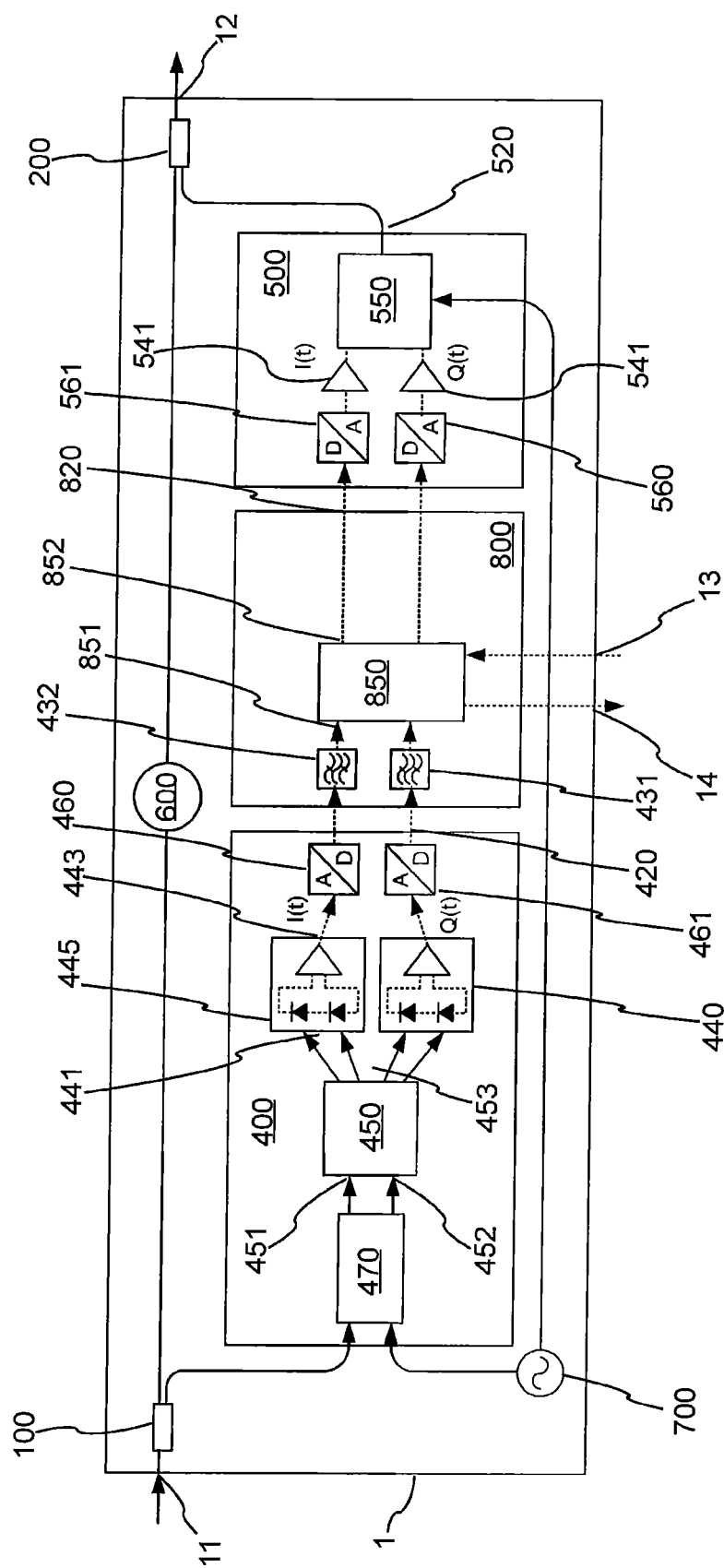
FIG. 3 shows the block diagram of an embodiment of the network element according to the invention with digital signal processing.

FIG. 3 shows an embodiment of the invention which comprises digital data processing. The embodiment shown in FIG. 3 also comprises a first coupler 100, a second coupler 200 and a local oscillator 700, as explained in connection with FIGS. 1 and 2. Part of the optical input signal which has been coupled out via the first coupler 100 is supplied to the optical receiver 400. Furthermore, an optical signal of a local oscillator 700 is supplied to the optical receiver 400, as described above. In some embodiments of the invention, both optical signals may be supplied to a device 470 for polarization regulation, as described above in connection with FIG. 2. In other embodiments of the invention, the device 470 for polarization regulation may also be dispensed with or may be replaced by a simple polarization filter.

Then, the optical signals arrive at a device 450, with which the intensity and/or the phase of the input signal may be extracted. In some embodiments of the invention, the device 450 may comprise a multimode interference coupler. In some embodiments of the invention, the multimode interference coupler may be a 2×4/90° hybrid or comprise such a hybrid. In this case, the device 450 has two inputs 451 and 452 and four outputs 453. The outputs 453 may be coupled in pairs to associated difference signal detectors 440 and 445.

The difference signal detectors 440 and 445 have a finite bandwidth, with the result that, in interaction with the local oscillator 700, they selectively extract the data signal of a predeterminable channel of the input signal.

The embodiment of the invention illustrated in FIG. 3 shows the most general case, in which both the intensity and the phase of the optical carrier signal are determined by means of two difference signal detectors 440 and 445. In this way, an optical data stream may be decoded which codes a plurality of data bits in a symbol duration by means of quadrature amplitude modulation. If the optical data signal has only amplitude modulation or only phase modulation, one of the difference signal detectors 440 and 445 may also be dispensed with in some embodiments of the invention.

Analog-to-digital converters are arranged at the output 443 of the difference signal detectors in order to generate a digital data stream from the electrical output signal of the difference signal detectors 440 and 445. The digital data stream then leaves the optical receiver 400 via the outputs 420 thereof and is supplied to the signal-processing device 800.

Even when only in each case one individual line connection is illustrated at the output of the analog-to-digital converters 460 and 461, this may of course include a plurality of physical conductors, for example for transmitting a plurality of digital data bits in parallel and/or as a connection to ground. The individual line illustrated in FIG. 3 therefore describes a logic connection between the optical receiver 400 and the signal processing device 800 and not an individual physical line.

As already explained in connection with FIG. 2, the signal-processing device 800 may have low-pass filters 431 and 432. In other embodiments of the invention, these low-pass filters may also be dispensed with or may be part of the optical receiver 400. Likewise, the analog-to-digital converters 460 and 461 may in some embodiments also be part of the signal-processing device 800 and not be arranged in the optical receiver 400.

Then, the signal arrives at a logic circuit 850 with at least one input 851 and at least one output 852. The logic circuit 850 may implement inversion of the data signal in some embodiments of the invention, as described in connection with FIG. 2. In this way, the output signal of the signal-processing device 800 comprises a signal component which cancels the data signal originally transported on the selected channel by means of interference in the second coupler 200.

Furthermore, the logic circuit 850 may implement further modifications of the supplied data signal. For example, regeneration of the signal may be performed in the logic circuit 850. In other embodiments of the invention, the logic circuit 850 may perform format conversion of the signal. In yet another embodiment of the invention, the logic circuit 850 may provide the data stream or a part thereof via the output 14 of the network element 1 and/or receive a data stream via the connection 13 of the network element 1. For this purpose, the logic circuit 850 may comprise a digital signal processor, a programmable logic circuit, a microprocessor or a microcontroller, which implements the respectively desired modifications of the data stream supplied via the connection 851.

The data stream modified in the logic circuit 850 leaves the logic circuit via the output 852. The digital data signal provided via the output 852 leaves the device 800 via the output 820 thereof. The data signal comprises a digital data stream, which represents the desired waveform with which the optical carrier is intended to be modulated in the downstream optical transmission device 500.

For the modulation of the optical carrier, an I/Q modulator 550 is used as shown in FIG. 3. The unmodulated optical carrier is supplied from the local oscillator 700 to the I/Q modulator 550. Furthermore, at least one electrical analog signal is supplied to the modulator 550, the waveform of said analog signal intending to be modulated onto the optical carrier. In order to produce this analog electrical signal, at least one digital-to-analog converter 560 and 561 is provided in the optical transmitter 800. In other embodiments of the invention, the digital-to-analog converters may also be part of the signal-processing device 800. The digital-to-analog converters 560 and 561 receive the data stream of the device 800 and provide the input signal for the modulator 550 at the outputs of said converters.

In some embodiments of the invention, the optical transmitter 500 may also comprise optional amplifiers 541, by means of which impedance matching, amplification or filtering of the analog signals may be performed. If the output signal of the optical transmitter 500 has only simple amplitude or phase modulation, in some embodiments of the invention a single modulator 550 may also be used, which only receives one of the analog signals illustrated.

The optical signal emitted by the optical transmitter 500 is in turn brought to interference in the second coupler 200, as has already been described in connection with FIGS. 1 and 2.

The invention is not, of course, limited to the embodiments represented in the figure and the illustrative embodiments. The above description should therefore not be regarded as limiting, but as illustrative. The following claims should be understood in such a way that a mentioned feature is provided in at least one embodiment of the invention. This does not exclude the possibility of the presence of further features. Insofar as the claims and the above description define "first" and "second" features, then this notation serves to differentiate between two similar features without stipulating an order of precedence.

The invention claimed is:

1. A network element having
   at least one first input, to which an optical signal may be supplied,
   at least one first output, which is designed to emit an optical signal,
   wherein the network element comprises further a first coupler, with an input and a first output and a second output, the first input of the network element being coupled to the input of the first coupler, and
   the network element further comprises an optical receiver, which has at least one input and at least one output, the second output of the first coupler being coupled to the input of the optical receiver,
   the network element further comprises an optical transmitter, which has at least one input and at least one output,
   the network element further comprises a signal-processing device with at least one first input and at least one first output, the output of the optical receiver being coupled to the input, and the input of the optical transmitter being coupled to the output,
   the network element further comprises a second coupler, with a first input, a second input and an output, the first output of the network element being coupled to the output of the second coupler, the first input of the second coupler being coupled to the first output of the first coupler, and the second input of the second coupler being coupled to the output of the optical transmitter,
   wherein the signal-processing device is adapted to provide a signal at its output which is formed such that it comprises a signal component which cancels the signal originally transported on this channel when interfering in the second coupler, and
   wherein the signal-processing device comprises at least one inverter with an input and an output and an optional low-pass filter with an input and an output,
      the input of the inverter being coupled to the first input and/or the second output of the signal-processing device,
      the output of the inverter being coupled to the output of the signal processing device and/or to the second input of the signal-processing device, and
      the optical low-pass filter being arranged in the signal path between the input of the inverter and the first input of the signal-processing device.

2. The network element according to claim 1, comprising further a delay element with an input and an output, the input being coupled to the first output of the first coupler, and the output being coupled to the first input of the second coupler.

3. The network element according to claim 1, comprising further at least one second input, to which a second signal comprising user data may be supplied, and/or at least one second output, which is designed to emit a first signal comprising user data, the second input of the network element being coupled to a second input of the signal-processing device and/or the second output of the network element being coupled to a second output of the signal processing device.

4. The network element according to claim 1, comprising further a local oscillator with at least one output, the optical transmitter and/or the optical receiver each having a second input, which is coupled to the output of the local oscillator.

5. The network element according to claim 1, wherein the first coupler is designed to provide approximately 5% to approximately 25% of the optical power of the input signal at the second output.

6. The network element according to claim 1, wherein the optical receiver comprises a third coupler, which comprises a first input, a second input, a first output and a second output, the first input of the third coupler being coupled to the first input of the optical receiver, and
   the second input of the third coupler being coupled to the second input of the optical receiver, and
   the optical receiver further comprises a difference signal detector, which comprises at least two inputs and at least one output,
   the output of the difference signal detector being coupled to the output of the optical receiver, and
   the inputs of the difference signal detector being coupled to the outputs of the third coupler.

7. The network element according to claim 1, wherein the optical receiver comprises a device being adapted to extract the intensity and/or the phase of an input signal, and which comprises at least one first input and at least one second input and at least one output, the first input being coupled to the first input of the optical receiver, and the second input being coupled to the second input of the optical receiver, and
   the optical receiver further comprises at least one difference signal detector, which comprises at least one input and at least one output, the output of the difference signal detector being coupled to the output of the optical receiver.

8. The network element according to claim 1, wherein the optical transmitter comprises an amplitude modulator and/or at least one amplifier and/or at least one digital-to-analog converter and/or at least one I-Q-modulator.

9. The network element according to claim 1, wherein the signal-processing device comprises at least one low-pass filter and/or an inverter and/or a logic circuit.

10. The network element according to claim 7, wherein the signal-processing device comprises at least one logic circuit with at least one input and at least one output,
    the input of the logic circuit being coupled to the first input of the signal-processing device,
    the output of the logic circuit being coupled to the first output of the signal-processing device.

11. The network element according to claim 10, wherein at least one digital-to-analog converter is coupled to the first output of the signal processing device.

12. The network element according to claim 7, wherein a device for controlling polarization is arranged in the signal path between the input of the optical receiver and the first input of the third coupler and/or in the signal path between the second input of the optical receiver and the second input of the third coupler.

13. The network element according to claim 1, wherein the first coupler and/or the second coupler and/or the third coupler comprises a multimode interference coupler or a fusion coupler.

14. A method for modifying a multichannel optical input signal, said method comprising the following steps:

splitting the optical power of the optical input signal into a first part and a second part;
converting the first part of the optical power of the optical input signal into an electrical signal;
supplying the electrical signal to a signal-processing device;
modifying the electrical signal in the signal-processing device, thereby providing a signal component which cancels the signal originally transported on this channel when the modified optical signal and the second part of the optical input signal are interfering to form an output signal;
converting the modified electrical signal into a modified optical signal; and
combining the modified optical signal and the second part of the optical input signal by interference to form an output signal.

15. The method according to claim 14, wherein a predeterminable channel is selected from the optical input signal when the first part of the optical power of the optical input signal is converted into an electrical signal.

16. The method according to claim 14, wherein a second signal comprising user data is supplied to the signal-processing device and/or a first signal comprising user data is coupled out from the signal-processing device.

17. The method according to claim 14, wherein the first part of the optical power of the optical input signal corresponds to approximately 5% to approximately 25% of the optical power of the optical input signal.

18. The network element according to claim 7, comprising further at least one analog-to-digital converter being arranged in the signal path between the output of the optical receiver and the output of the difference signal detector.

* * * * *